United States Patent Office
2,901,491
Patented Aug. 25, 1959

2,901,491

PURIFICATION OF WORKING SOLUTIONS FOR PRODUCING HYDROGEN PEROXIDE

Carl W. Eller, Jr., and James M. Snyder, Memphis, Tenn., assignors to E. I. du Pont de Nemours and Company, Wilmington, Del., a corporation of Delaware No Drawing. Application May 24, 1957
Serial No. 661,283

15 Claims. (Cl. 260—369)

This invention relates to the purification of working solutions employed in producing hydrogen peroxide in cyclic operations involving the catalytic reduction of an anthraquinone and subsequent oxidation of the resulting anthrahydroquinone to reform the anthraquinone and simultaneously produce hydrogen peroxide. More particularly, it relates to a method of purifying such working solutions after they have become degraded through use in the peroxide-synthesis operations.

Processes for producing hydrogen peroxide by operations of the above type are well known and many anthraquinone compounds (and their tetrahydro derivatives), particularly the lower alkyl anthraquinones in which the alkyl group is attached in the 2-position, have been proposed as working intermediates. The working solutions in such processes comprise a solution of the anthraquinone intermediate in a water-immiscible organic solvent. Many mixed and single-component solvents have been proposed. So far as the present invention is concerned the working solution can be a solution of any anthraquinone compound, or mixture of such compounds, in any solvent or solvent mixture, which are known to be suitable for peroxide synthesizing processes of the above type.

It is well known that in such processes the peroxide synthesizing capacity of the working solution decreases with continued use in the cyclic operations due to degradation of the anthraquinone working intermediate. Such degradation results in the formation of by-products which are inert, i.e., they do not synthesize hydrogen peroxide in the cyclic operation. The inert anthraquinone degradation products are of two general types: (1) regenerable inerts, i.e., those which can be reconverted to anthraquinone compounds usable in the synthesis of hydrogen peroxide; and (2) non-regenerable inerts, i.e., those which cannot readily be reconverted to usable compounds. Conversion of the regenerable inerts to usable or active compounds obviously is desirable and ways of accomplishing this are known. On the other hand, the non-regenerable inerts serve no useful purpose and, in fact, their removal is highly desirable if not essential since their presence at high concentrations adversely affects the specific gravity of the working solution and restricts the amount of useful working intermediate that can be successfully retained in the solution.

It is an object of the invention to provide an effective method for removing inert anthraquinone degradation products from working solutions of the above type. A further object is to provide a method of separating non-regenerable inert materials from the other components of degraded working solutions. Still further objects will be apparent from the following description.

The objects of the invention are accomplished by removing the anthrahydroquinone values from hydrogenated degraded working solution by extracting the working solution with an aqueous solution of a water-soluble metal hydroxide, recovering the solvent component of the resulting working solution, e.g., by distillation, to leave inert anthraquinone degradation products as residue, recovering the anthrahydroquinone values from the aqueous extract, and dissolving the recovered values in the recovered solvent to obtain a reconstituted purified working solution.

In one embodiment of the invention, the degraded working solution is first hydrogenated so as to convert substantially all of the usable anthraquinone compounds present to anthrahydroquinones. The latter are separated by extraction with an aqueous solution of sodium hydroxide in which they are soluble in the form of their sodium salts. Recovery of the anthrahydroquinone values from the aqueous extract solution is accomplished by oxidizing the solution to convert the anthrahydroquinones to anthraquinones which precipitate. The latter are then recombined with the organic solvent recovered by distilling the organic solution remaining after the sodium hydroxide extraction step. In this embodiment, the residue remaining from the distillation step to recover the solvent will include both regenerable and nonregenerable inert materials.

In another embodiment, the organic solution which remains following the sodium hydroxide extraction step, and which will include both regenerable and non-regenerable inerts, is treated to reconvert the regenerable inerts to usable anthraquinone compounds and the solution, in its reduced form, is again extracted with sodium hydroxide solution to recover the regenerated anthrahydroquinone values for reuse in the purified and reconstituted working solution. In this embodiment, the residue of inert materials remaining from the distillation to recover solvent will consist essentially of non-regenerable inerts and will be discarded.

An advantage of employing a second sodium hydroxide extraction step as indicated above is that it requires less vigorous hydrogenation conditions to obtain substantially complete recovery of the anthraquinones since the hydrogenation can be effected in stages under relatively mild conditions. However, useful results can be obtained when such regeneration treatment precedes a single extraction with sodium hydroxide. Whether using one or more extractions with sodium hydroxide, the working solution extracted in the last of such extractions should have been hydrogenated to convert substantially all anthraquinones present to anthrahydroquinones, otherwise useful anthraquinones will be lost along with the inerts which remain as residue from the solvent distillation step. On the other hand, the working solution which is extracted by the first of two extractions with sodium hydroxide, need not be completely hydrogenated and it will generally be most convenient to employ degraded solution as it comes from the hydrogenation stage of the hydrogen peroxide process where hydrogenation is usually effected only to about 40 to 70% of completion.

Recovery of anthrahydroquinone values from the aqueous extract of the extraction step can be effected in any desired manner. The hydroquinones can be separated for use in reconstituting the working solution by acidifying the extract to precipitate them. Preferably, the extract is treated with free or elemental oxygen which converts the anthrahydroquinones to anthaquinones which are precipitated for reuse. A convenient source of oxygen for this purpose is air. Most preferably, such conversion is effected in the presence of the organic solvent employed in the working solution, e.g., solvent recovered from the solvent distillation step. In such operations, the anthraquinones formed in the oxidation dissolve directly in the organic solvent to form the purified working solution which requires only washing with water to free it of traces of alkali before it is ready for reuse.

The invention is illustrated by the following examples in which all concentrations are weight percentages, unless otherwise stated.

Example 1

A working solution initially consisting of a solution of 2-t-butylanthraquinone in a mixture of α-methylnaphthalene and diisobutylcarbinol was used in cyclic reduction-oxidation operations for the production of hydrogen peroxide until it had become degraded to a substantial extent. The degraded solution, which contained 16.01% active anthraquinones (2-t-butylanthraquinone and the corresponding tetrahydroanthraquinone) and 5.61% inert materials (regenerables and non-regenerables), was hydrogenated at 40° C. in the presence of a catalyst comprising metallic palladium on an activated alumina support until 95% of the anthraquinones present were converted to anthrahydroquinones, i.e., hydrogenated to 95% of completion. The hydrogenated solution (225 ml.) was extracted with 8 successive portions (200 ml. each) of an aqueous 10% sodium hydroxide solution, leaving the solution of the inerts in the organic solvent. The latter was distilled under reduced pressure to recover 90% of the solvent in pure form, the remainder of the solvent being discarded with the residue of inert materials. The aqueous extract containing the anthrahydroquinones in salt form was oxidized at room temperature with oxygen in the presence of the recovered purified organic solvent, whereby the anthrahydroquinones were converted to anthraquinones which were dissolved as formed by the organic solvent. The resulting organic phase, after separation from the aqueous phase, was in effect a reconstituted, purified working solution in which 93% of the active anthraquinones originally present in the degraded working solution was recovered free from inert degradation products.

Example 2

To 129 ml. of a degraded working solution similar to that of Example 1 containing 15.34% active anthraquinones and 6.23% inerts, there were added 49.5 g. granular zinc metal and 68.4 g. of a 19.6% aqueous sulfuric acid solution. The mixture was agitated at room temperature for 18.5 hours, at which time hydrogenation of the anthraquinones was about 97% complete. The mixture was then treated as in Example 1 to recover solvent and active anthraquinones. The recovery of the latter was 97%.

Example 3

Three hundred milliliters of a degraded working solution similar to that of Example 1 containing 16.34% active anthraquinones and 5.42% inerts was mixed with 55.5 g. powdered zinc metal and 272 g. of a 10% aqueous solution of sodium hydroxide. The mixture was stirred at room temperature for 4 hours, extracted with aqueous sodium hydroxide and the resulting extract and organic solution were worked up as in Example 1. The recovery of active anthraquinones was 98.2%.

Example 4

Two hundred milliliters of a degraded working solution similar to that of Example 1 containing 15.62% active anthraquinones and 6.35% inerts was hydrogenated at 40° C. in the presence of a palladium catalyst and of 200 ml. of a 10% aqueous solution of sodium hydroxide until hydrogenation was nearly complete. The organic phase was separated from the aqueous phase and extracted with further amounts of the sodium hydroxide solution. The combined aqueous extracts and the organic phase were then worked up as described in Example 1. The recovery of active anthraquinones was 96.4%.

Example 5

A degraded working solution (100 ml.) which contained 14.69% anthraquinones and 6.44% inert materials and had been catalytically hydrogenated to 60% of completion, was extracted with aqueous sodium hydroxide to give a raffinate solution containing 5.75% active anthraquinones. The raffinate was then hydrogenated substantially completely at 40° C. in the presence of a palladium-on-alumina catalyst and again extracted with sodium hydroxide solution. The combined extracts were blown with air to recover 96.1% of the anthraquinones originally present in the degraded working solution.

Degraded working solutions similar to those of the above examples can be purged with air for 0.5 to 5 hours at 125 to 200° C., to reconvert a substantial part of the inert materials initially present to usable or active anthraquinones, as described in our application S.N. 661,282, filed of even date herewith. The regenerated anthraquinones can then be recovered along with the anthraquinones originally present by a procedure similar to that of Example 1. In such a case, the inerts separated as the residue from the solvent distillation step would be mainly non-regenerable inerts.

If regeneration of regenerable inert materials as well as separation of non-regenerable inert materials is desired, the last extraction step with sodium hydroxide solution should be preceded by a treatment which will convert at least a substantial part of the regenerable inerts to usable anthraquinones. Such regeneration can be effected by heating the degraded working solution in the presence of activated alumina or active magnesia at a temperature of at least 55° C., as described by Sprauer et al. in U.S. Patent 2,739,875. Another method is to heat the degraded solution to 125 to 200° C., while purging it with free oxygen, e.g., in the presence of a surface active catalyst, as described in our application S.N. 661,282, filed of even date herewith.

The concentration of the metal hydroxide solution employed in the extraction step is not critical but sufficient of the extracting solution should be employed to extract all anthrahydroquinones in the solution being extracted. Generally, an excess of the hydroxide solution will be used. Any water-soluble metal hydroxide can be used but the alkali metal hydroxides such as sodium and potassium hydroxides are preferred because of their excellent solubilities. Sodium hydroxide is especially preferred because of its relative cheapness. Metal hydroxide concentrations of from 5% to 30% are preferred and those of 10 to 20% are most preferred. Concentrations below 5%, e.g., less than 1% can be used.

The extractions with the metal hydroxide solution ordinarily will be effected at about ambient temperature. Higher and lower temperatures, e.g., between the freezing and boiling points of the liquids, preferably 10 to 75° C., can also be used. Reduction prior to extraction to convert anthraquinones to anthrahydroquinones is preferably effected by hydrogenating in the presence of a catalyst such as Raney nickel or a supported palladium or platinum catalyst at temperature and pressure conditions known to be effective for the hydrogenation stage of cyclic anthraquinone methods for producing hydrogen peroxide.

The invention provides a practical method for purifying degraded working solutions. It can be used to remove both regenerable and non-regenerable inert anthraquinone degradation products. When practiced in conjunction with a treatment for converting regenerable inerts to usable anthraquinones, it can also be used to remove substantially only the non-regenerable inerts. However, in either type of operation, extraction of the reduced working solution with the metal hydroxide solution will also remove acidic by-products, e.g., undesirable phenolic compounds, of the hydrogen peroxide synthesis operations, which by-products will normally be retained by and discarded with the hydroxide solution after the latter has been reused a number of times.

Upon reconstituting the purified working solution by dissolving the recovered anthraquinone values in the recovered solvent, the resulting solution generally will be adjusted as required by the addition of more solvent or more anthraquinone to provide a solution of the composition desired for use in the hydrogen peroxide synthesis operations. The method of the invention can be usefully employed to purify periodically all of the working solution in the hydrogen peroxide synthesis system. Alternatively, only such a portion of the working solution will be periodically or continuously purified and returned to the synthesis system as will maintain the working solution of the system at a desired or acceptable degree of purity.

We claim:

1. The method of purifying a working solution of a working intermediate from the group consisting of anthraquinones, tetrahydroanthraquinones and mixtures thereof in a water-immiscible organic solvent, which solution has become degraded through use in cyclic reduction and oxidation operations for the production of hydrogen peroxide, said method comprising extracting anthrahydroquinone values from said degraded solution in its reduced state with an aqueous solution of a water-soluble metal hydroxide, recovering organic solvent from the residual organic solution, recovering the anthrahydroquinone values from the aqueous extract and dissolving them in the recovered organic solvent.

2. The method of purifying a working solution of a working intermediate from the group consisting of anthraquinones, tetrahydroanthraquinones and mixtures thereof in a water-immiscible organic solvent, which solution has become degraded through use in cyclic reduction and oxidation operations for the production of hydrogen peroxide, said method comprising extracting anthrahydroquinone values from said degraded solution in its reduced state with an aqueous solution of an alkali metal hydroxide at a temperature between the freezing and boiling points of the liquids, recovering organic solvent from the residual organic solution, recovering the anthrahydroquinone values from the aqueous extract and dissolving them in the recovered organic solvent.

3. The method of claim 2 in which the alkali metal hydroxide is sodium hydroxide.

4. The method of purifying a working solution of a working intermediate from the group consisting of anthraquinones, tetrahydroanthraquinones and mixtures thereof in a water-immiscible organic solvent, which solution has become degraded through use in cyclic reduction and oxidation operations for the production of hydrogen peroxide, said method comprising extracting anthrahydroquinone compounds from said degraded solution in its reduced state with an aqueous solution of an alkali metal hydroxide, distilling the residual organic solution to recover the organic solvent therefrom, oxidizing the aqueous extract to convert the anthrahydroquinones therein to anthraquinones and dissolving the latter in the recovered solvent.

5. The method of claim 4 wherein oxidation of the aqueous extract is effected by means of elemental oxygen.

6. The method of claim 5, wherein oxidation of aqueous extract is effected in the presence of the recovered solvent whereby the anthraquinone compounds formed by the oxidation dissolve directly in the recovered solvent.

7. The method of purifying a working solution of a working intermediate from the group consisting of anthraquinones, tetrahydroanthraquinones and mixtures thereof in a water-immiscible organic solvent, which solution has become degraded through use in cyclic reduction and oxidation operations for the production of hydrogen peroxide, said degraded solution containing degradation products which are regenerable to anthraquinones and degradation products which are non-regenerable to anthraquinones, said method comprising regenerating said regenerable degradation products to anthraquinones, converting substantially all anthraquinones in the resulting solution to anthrahydroquinones, extracting said anthrahydroquinones with an aqueous solution of an alkali metal hydroxide, distilling the residual organic solution to recover the organic solvent and leave a residue of said non-regenerable degradation products, treating the aqueous extract with elemental oxygen to convert the anthrahydroquinones herein to anthraquinones, and dissolving the latter in the recovered solvent.

8. The method of purifying a working solution of a working intermediate from the group consisting of anthraquinones, tetrahydroanthraquinones and mixtures thereof in a water-immiscible organic solvent, which solution has become degraded through use in cyclic reduction and oxidation operations for the production of hydrogen peroxide, said degraded solution containing degradation products which are regenerable to anthraquinones and degradation products which are non-regenerable to anthraquinones, said method comprising converting 40 to 70% of the anthraquinones in said degraded solution to anthrahydroquinones and extracting the latter with an aqueous solution of an alkali metal hydroxide, treating the resulting extracted working solution to regenerate said regenerable degradation products to anthraquinones, converting substantially all of the regenerated anthraquinones to anthrahydroquinones and extracting the latter with an aqueous solution of an alkali metal hydroxide, distilling the residual organic solution to recover the organic solvent and leave a residue comprising said non-regenerable degradation products, treating the aqueous extracts with elemental oxygen to convert the anthrahydroquinones therein to anthraquinones, and dissolving the latter in the recovered solvent.

9. The method of claim 7 wherein the aqueous extract is treated with elemental oxygen in the presence of the recovered solvent.

10. The method of claim 8 wherein the aqueous extracts are treated with elemental oxygen in the presence of the recovered solvent.

11. The method of claim 7 wherein the alkali metal hydroxide is sodium hydroxide.

12. The method of claim 8 wherein the alkali metal hydroxide is sodium hydroxide.

13. The method of claim 2, wherein the working intermediate is a mixture of 2-t-butylanthraquinone and tetrahydro-2-t-butylanthraquinone.

14. The method of claim 4, wherein the working intermediate is a mixture of 2-t-butylanthraquinone and tetrahydro-2-t-butylanthraquinone.

15. The method of claim 8, wherein the working intermediate is a mixture of 2-t-butylanthraquinone and tetrahydro-2-t-butylanthraquinone.

References Cited in the file of this patent

FOREIGN PATENTS 741,499    Great Britain _____ Dec. 7, 1955